United States Patent [19]

Maeda et al.

[11] 4,349,266

[45] Sep. 14, 1982

[54] LENS CAP FOR A CAMERA

[75] Inventors: Keisuke Maeda; Keiji Takechi, both of Sakai; Tetsuro Oya, Osaka, all of Japan

[73] Assignee: Minolta Camera KK, Osaka, Japan

[21] Appl. No.: 224,568

[22] PCT Filed: Aug. 26, 1980

[86] PCT No.: PCT/JP80/00197

§ 371 Date: Nov. 19, 1980

§ 102(e) Date: Nov. 19, 1980

[87] PCT Pub. No.: WO81/00624

PCT Pub. Date: Mar. 5, 1981

[30] Foreign Application Priority Data

Aug. 30, 1979 [JP] Japan ............................ 54-119956[U]

[51] Int. Cl.³ ....................... G03B 11/04; G03B 17/02
[52] U.S. Cl. ..................................... 354/295; 350/65; 354/288
[58] Field of Search .............. 354/202, 199, 221, 288, 354/295, 219, 266, 64, 154, 145, 187; 350/65

[56] References Cited

U.S. PATENT DOCUMENTS

| | | | |
|---|---|---|---|
| 3,441,072 | 4/1969 | Schmitt | 354/288 X |
| 3,602,118 | 8/1971 | Oberheim | 354/288 |
| 4,019,192 | 4/1977 | Miyagawa | 354/187 |
| 4,130,356 | 12/1978 | Yamanaka | 354/145 |

FOREIGN PATENT DOCUMENTS

| | | | |
|---|---|---|---|
| 870941 | 3/1953 | Fed. Rep. of Germany | 354/288 |
| 1011725 | 7/1957 | Fed. Rep. of Germany | 354/202 |
| 54-106835 | 7/1979 | Japan | 354/187 |

Primary Examiner—Donald A. Griffin
Attorney, Agent, or Firm—Watson, Cole, Grindle & Watson

[57] ABSTRACT

A lens cap is formed with not only a lens covering portion for covering the photographic objective lens of a camera, but also with both a portion, such as protection wall for preventing inadvertent operation of the camera shutter release button and a projection for preventing unexpected movement of the operation member of the camera which is adapted for switching the camera from a normal photography condition to a flash photography condition. The lens cap may be further provided with covering portion for covering the camera viewfinder window as well as the range finder window.

22 Claims, 3 Drawing Figures

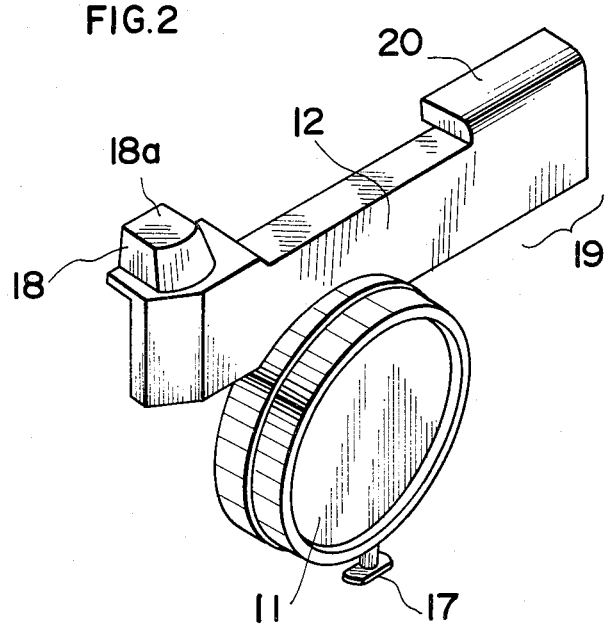
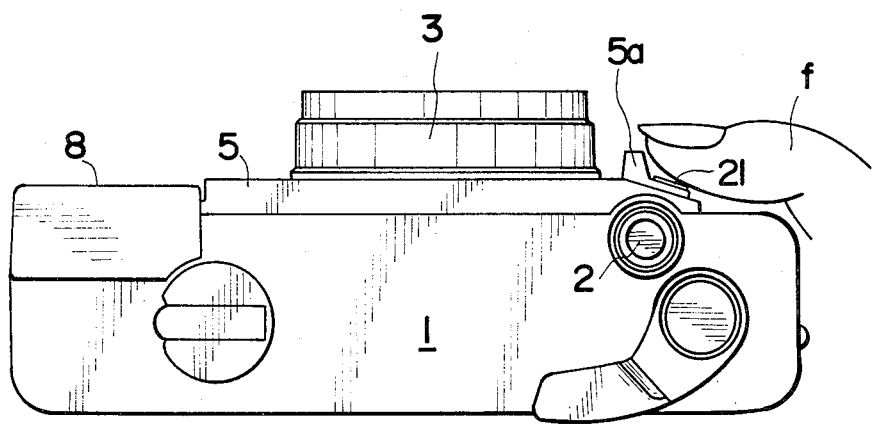

LENS CAP FOR A CAMERA

FIELD OF THE INVENTION

The present invention relates to a lens cap for a camera, and more particularly to a lens cap which, when the camera is not in use, not only covers the front of the camera objective lens, thereby protecting the objective lens, but also covers other parts of the camera, thereby preventing any misoperation of the camera.

BACKGROUND OF THE INVENTION

A lens cap is generally used for protecting an objective lens of a camera when the camera is not in use. However, when a camera includes a viewfinder optical system which operates independently of the photographic optical system, such as in the case of a direct viewing-type viewfinder, misoperation of the camera can result when the user erroneously operates the manual operating members, e.g., either the shutter release member or, when the camera includes a built-in flash device, the switching member which controls whether the camera is set to normal or flash photography conditions. This misoperation may occur because the user may not notice that the lens cap has not been removed from the front of the camera.

As a means to avoid misoperation of the camera, it has been proposed to provide a lens cap detection pin on the forward end of the camera lens barrel to detect whether or not a lens cap is mounted on the camera to lock the shutter release button upon detection of the cap. However, this structure requires the camera to be provided with a locking member for locking the shutter release member and a complex interlocking mechanism for linking the detection pin with the locking member, resulting in complexity of the mechanism, as well as an increase in camera size and in the cost of manufacture.

In a twin-lens reflex camera and the like, a lens cap has been used which covers both the photographic objective lens and the viewfinder objective lens so that a photographer, upon looking through the viewfinder, will notice the lens cap covering the lenses. However, it is impossible for such a lens cap to prevent operational errors with the camera, for example, the inadvertent depressing of the shutter release button and the resultant undesired exposure of the film when the camera is not intended to be used or the inadvertent turning on of the power switch of the electronic flash device built into the camera, causing the power source battery to be wastefully consumed.

The primary object of the present invention is to provide a very simple device which is capable of preventing any inadvertent operations of the camera when the camera is not in use.

SUMMARY OF THE INVENTION

To achieve the aforementioned object, the present invention provides a lens cap formed integrally with a protector portion which protects the manual operating members, such as the shutter release button and the power switch operating member for the electronic flash device, from being operated when the lens cap is mounted on the camera. The protector portion is constructed to prevent external force from reaching the manual operating members, or prevents the movement of the manual operating member even when an external force is applied, whereby the manual operating members may not erroneously be operated with the lens cap remaining mounted on the camera.

Further, from a structural viewpoint, only a protector portion formed integrally with a lens cap will suffice, thus and unlike conventional lens cap requiring no additional member to be assembled into the camera, whereby the camera can remain unchanged both in size and cost.

In accordance with one embodiment of the present invention, a lens cap is integrally formed to include a protector wall which is capable of surrounding the camera shutter release button when the lens cap is mounted on the camera lens, thereby preventing a user's finger, body, or in fact any object near the camera from contacting the shutter release button to result in its inadvertent operation. The top of the protector wall may either be opened or closed.

According to another feature of the inventive lens cap, the lens cap is integrally formed with a protector portion which prevents the power switch operating member of a camera (which includes a built-in electronic flash device) from being operated when the lens cap is mounted on the camera lens.

According to still another feature of the inventive lens cap, the lens cap is integrally formed with a protector portion which prevents operation of an operating member for a changeover from ordinary photography to flash photography when the lens cap is mounted on the camera lens.

According to still another feature of the inventive lens cap, the lens cap is integrally formed with a covering portion which covers the objective lens of the camera viewfinder in addition to the covering portion which covers the photographic objective lens, as well as a protector portion for preventing the manual operating members from being erroneously operated.

In addition, a covering portion may be formed on the lens cap to cover the light-emitting portion of an electronic flash device built into the camera.

A lens cap in accordance with another embodiment of the present invention includes connector means to connect it to an outer case for the camera, thereby preventing the lens cap from being separated from the camera and lost while the camera is in use.

These and other objects and features of the present invention will be more apparent from the following description taken in conjunction with the accompanying drawings.

BRIEF DESCRIPTION OF THE DRAWINGS

FIG. 2 is a perspective view of a lens cap in accordance with a second embodiment of the present invention.

FIG. 3 is a top view of the camera shown in FIG. 1.

DETAILED DESCRIPTION OF THE PREFERRED EMBODIMENTS

Figure 1:
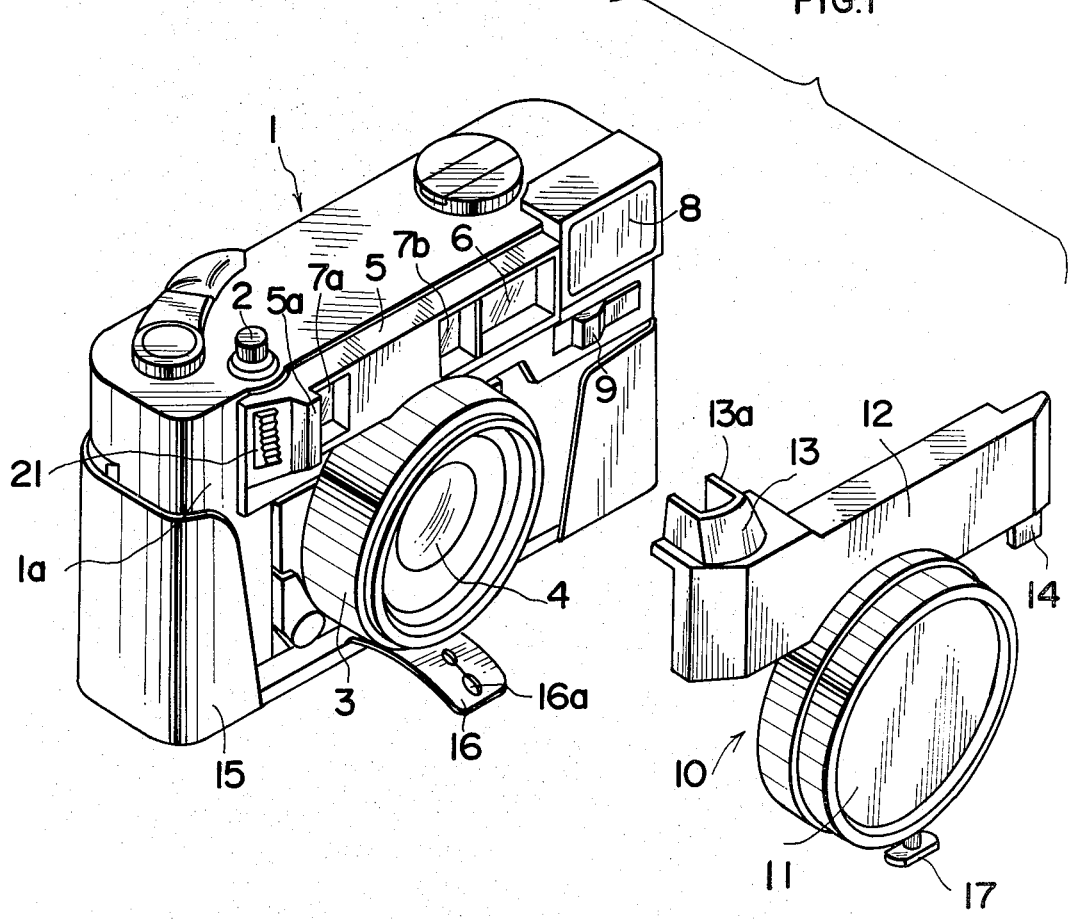
FIG. 1 shows an exploded perspective view of a lens cap constructed in accordance with a first embodiment of the present invention, together with a camera to which the lens cap is to be attached.

With reference to FIG. 1, camera body 1 is provided with a shutter release (camera actuation) button 2 and a lens barrel 3 which includes a photographic objective lens 4. Camera body 1 includes a viewfinder optical system, such as a direct view-type viewfinder, which is entirely independent of the photographic optical system, and it also has viewfinder window frame 5 which forms a light inlet for the viewfinder. Viewfinder window frame 5 is integrally formed with viewfinder window 6 and rangefinder windows 7a and 7b, all of which are formed to slightly project from front surface 1a of camera body 1 when mounted thereon. Also formed integrally with viewfinder window frame 5 is a protector wall 5a projecting beside rangefinder window 7a, which protector wall serves to prevent a photographer's finger f from covering rangefinder window 7a when the movable member 21 of the camera is being used, as shown in FIG. 3. Camera body 1 includes a built-in electronic flash device having light-emitting portion 8, as well as a switching member 9 for switching the camera from ordinary daylight photography to flash photography. When switching member 9 is shifted from a rest position shown in FIG. 1 to an operating position wherein the member registers with a flash mark, the power switch of the electronic flash device is closed in a known manner and a focus-adjusting mechanism is interlocked with a diaphragm mechanism, so that the diaphragm aperture is adjusted in response to focus adjustment, thereby establishing a so-called "flashmatic condition."

Lens cap 10 in accordance with the present device includes covering portion 11 which is engageable with lens barrel 3 to cover objective lens 4, viewfinder covering portion 12 which is engageable with viewfinder window frame 5 to cover viewfinder window 6 and rangefinder windows 7a and 7b formed thereon, and first and second protective portions 13 and 14. All the noted portions of the lens cap are integrally molded of a plastic material or other appropriate material.

The covering portion 11 is seen to include a ring-shaped member 11a and a disc-shaped member 11b which closes off the front (as seen in FIG. 1) end of member 11a; and the viewfinder covering portion 12, which is integrally connected to the member 11a to extend generally perpendicularly to an imaginary center line through member 11a, includes an upwardly (as seen in FIG. 1) extending, generally rectangular member 12a and a member 12b extending perpendicularly rearwardly from part of the upper edge of the member 12a. First protective portion 13 is formed as a three-sided protector wall extending upwardly from one end of the viewfinder covering portion 12 to surround shutter release button 2 on three sides, and top wall 13a thereof is formed to be flush with or higher than the top face of shutter release button 2. On the other hand, second protective portion 14 is formed as a generally rectangular projection extending downwardly from the opposite end of the viewfinder covering portion 12 to be positioned within the path of movement of switching member 9 when viewfinder covering portion 12 is engaged with viewfinder window frame 5.

It should be understood that camera body 1 as shown in FIG. 1 is equipped with an automatic focus-adjusting device, and rangefinder windows 7a and 7b serve as light inlets therefor. The automatic focus-adjusting device is normally actuated by means of shutter release button 2 to perform a focus-adjusting operation and the camera commences exposure of a film after the focus-adjusting operation has been completed. In addition, movable member 21 located beside protector wall 5a of camera body 1 is used to operate only the automatic focus-adjusting device prior to the shutter release operation. When movable member 21 is depressed down from the position shown in FIG. 1, the automatic focus-adjusting device alone operates, while the exposure mechanism of the camera remains inoperative. Consequently, when shutter release button 2 is depressed after movable member 21 has been operated, no focus adjustment is performed at the time of operation of the shutter release button, and exposure is made with the focus condition determined by the operation of movable member 21 and left unchanged thereafter.

It should be noted that the automatic focus-adjusting device and the mechanism for actuating the latter alone, independently of an exposure mechanism, i.e., when the aforementioned movable member is operated, are known per se and thus the detailed description thereof is omitted here for simplification.

When attached to camera body 1, lens cap 10, formed as described above, covers objective lens 4 and viewfinder window 6 completely to protect them from exposure to finger prints and dirt which otherwise would adversely affect the clarity of the viewfinder image and the image-forming property of the objective lens. In addition, when lens cap 10 is mounted on the camera lens, first protective portion 13 is formed as a protective wall is located around shutter release button 2 with top edge 13a thereof being flush with or higher than the top face of the shutter release button 2, whereby the shutter release button 2 is completely prevented from being manually operated. That is, when a photographer attempts to operate shutter release button 2 without noticing that the lens cap mounted on a camera lens, the operation is completely prevented by first protective portion 13, thereby eliminating the possibility of any advertent shutter release operation. Furthermore, under such conditions, since second protective portion 14 is located within the path of movement of switching member 9, it is completely prevented from being manually operated, thereby eliminating any possibility of a photographer shifting switching member 9 inadvertently to flash photography position. Hence, waste of the battery power for the electronic flash device is avoided. In addition, since second protective portion 14 is adapted to be located within the path of movement of switching member 9, second protective portion 14 is prevented by switching member 9 from being positioned within the path of movement of the switching member 9 while the latter is set in the operating position. This also makes it impossible for the lens cap 10 itself to be mounted perfectly on camera body 1. As a result, a warning is given to a photographer that the camera is still in a flash photography mode with power being supplied to the flash firing circuit. Thus, the photographer will be alerted to the fact that battery power is being wasted. In other words, second protective portion 14 ensures that the power source for the electronic flash device is not left turned-on when the camera is not being used.

It is to be noted that, in the above embodiment, an appropriate connecting means may be provided between the lens cap and either the camera body or with the camera case in order to prevent the lens cap from being misplaced or lost. Referring now to FIG. 1, tongue portion 16 with slit 16a therein is attached to the outer camera case 15, which is detachably fitted on camera body 1, while lens cap 10 in integrally formed with engaging portion 17 having an enlarged portion at the tip. Lens cap 10 is connected to camera outer case 15 by inserting engaging portion 17 into slit 16a in tongue portion 16. The above construction allows lens cap 10 to be easily connected to or removed from camera outer case 15, thus making the connecting means unobstructive as compared with a lens cap having other connecting means, yet simultaneously eliminating the loss of lens cap 10.

FIG. 2 shows a second embodiment of the present invention, wherein the same reference numerals are used for individual parts identical in shape and function to those of the first embodiment. With the first embodiment, first protective portion 13 surrounds shutter release button 2 around only its sides. With the second embodiment, however, first protective portion 18 is provided with not only a protective wall similar in shape to that of the first embodiment but also protective portion 18a integrally formed therewith to cover the top of the shutter release button 2, whereby not only a photographer's finger but also objects of any shape are prevented from operating shutter release button, such that prevention of an untimely exposure may be made more effective. Moreover, auxiliary covering portion 19 is formed as an extended portion of the viewfinder covering portion 12. With this structure together with the covering of objective lens 4, viewfinder windows 6, 7a and 7b and the like, covering is ensured for all the portions of the camera that are subject to breakage and damage, thereby serving for enhancement of durability of the camera.

It should be noted that, besides the camera with light-emitting portion 8 fixed to the camera body as shown in the first embodiment, there are well known cameras provided with a light-emitting element which is popped up from the retracted position shown in FIG. 2 to project out of the camera housing in response to an operation of a switching member. Such cameras are constructed such that the switching member for the selection of flash photography is biased to normally occupy a rest position and must be pushed toward an operative position for switching the camera to a flash photography condition. When the switching member is pushed, the light-emitting element biased in the direction to pop out is unlocked and moves to a projecting position, whereby the flash light-emitting circuitry is closed and thus a "flashmatic condition" is effected.

If the lens cap according to the present invention is to be used with the above-type cameras, a modification now described is useful. Auxiliary protective portion 19 formed to cover the light-emitting portion is integrally formed with horizontally-extending rim 20 to be located within the path of movement of light-emitting element and adjoining the top face of the light-emitting element when it is positioned in the housing. With such formation of the horizontally-extending rim, when the camera is not in use with a lens cap of this type attached, horizontally-extending portion 20 will block movement of light-emitting element out of the camera body and will keep the same in a retracted position, thereby eliminating the possibility of the flash firing circuit being inadvertently closed, even if the switching member is accidentally shifted to an operative position. In addition, with this construction, the lens cap is not mountable on a camera unless the light-emitting element is pushed back into its retracted position, whereby failure in turning off the flash firing circuit is prevented through the mounting operation of the lens cap.

We claim:

1. A lens cap for use with a camera which includes a camera body having a viewfinder window, a manually-operable member extending outwardly of the camera body and a lens barrel extending outwardly of the camera body, the lens barrel containing a photographic objective lens, the lens cap comprising a first covering portion formed of a ring-shaped part and a disc-shaped part which encloses the front end of the ring-shaped part, the ring-shaped part being engageable around the camera lens barrel such that the disc-shaped part covers the front end of the camera lens barrel and the photographic objective lens therein, a second covering portion integrally connected to the first covering portion and extending laterally thereof, the second covering portion covering the viewfinder window of the camera body when the first covering portion is engaged around the camera lens barrel, and a protective means integrally connected to the second covering portion, the protective means surrounding at least three sides of the manually-operable member to prevent manual operation thereof when the first covering portion is engaged around the camera lens barrel, the first and second covering portions and the protective means being integrally molded of a plastic material.

2. The lens cap as defined in claim 1 wherein the manually-operable member of the camera with which the lens cap is usable is a shutter release button extending outwardly from the top of the camera body and wherein the protective means of the lens cap includes a three-sided protector wall which respectively surrounds the front and sides of the shutter release button.

3. The lens cap as defined in claim 2 wherein the protective means includes a top wall which is connected to the three-sided protector wall to cover the top of the shutter release button.

4. The lens cap as defined in claim 1 wherein the camera body of the camera with which the lens cap is usable additionally includes a rangefinder window to enable measurement of camera-to-object distances and wherein the second covering portion of the lens cap is shaped to cover the rangefinder window when the first covering portion is engaged around the camera lens barrel.

5. The lens cap as defined in claim 1 wherein the second covering portion includes a generally rectangular front part which is integrally connected to the ring-shaped part of the first covering portion and wherein the generally rectangular front part extends in a generally perpendicular direction with respect to an imaginary center line passing through the ring-shaped part.

6. The lens cap as defined in claim 5 wherein the second covering portion includes a top part which extends perpendicularly rearwardly from the edge of the front part remote from the first covering portion.

7. The lens cap as defined in claim 6 wherein the protective means extends generally perpendicularly away from the top part.

8. The lens cap as defined in claim 1 wherein an engaging portion is integrally connected to the ring-shaped part of the first covering portion to enable the lens cap to be attached to a camera case used to contain the camera with which the lens cap is usable.

9. The lens cap as defined in claim 1 wherein the camera body of the camera with which the lens cap is usable includes a light-emitting window for a camera flash device and wherein the lens cap includes an auxiliary covering portion connected to the second covering portion for covering the light-emitting window when the first covering portion is engaged around the camera lens barrel.

10. The lens cap as defined in claim 9 wherein the auxiliary covering portion is integrally formed with the second covering portion.

11. The lens cap as defined in claim 10 wherein the camera body of the camera with which the lens cap is usable includes a movable switching member for activating the light-emitting window and wherein the lens cap includes an auxiliary protective portion connected to the second covering portion for blocking the movement of the switching member when the first covering portion is engaged around the camera lens barrel.

12. The lens cap as defined in claim 1 wherein the camera body of the camera with which the lens cap is usable includes a light-emitting element which can move outwardly from a retracted position within the camera body and wherein the lens cap includes a rim connected to the second covering portion for blocking the outward movement of the light-emitting element when the first covering portion is engaged around the camera lens barrel.

13. A lens cap adapted for use with a camera which includes a camera lens barrel containing a photographic objective lens, a manually-operable camera actuation member, and a switching member for activating a camera flash device, said lens cap comprising
   a covering means which includes a first covering portion formed of a ring-shaped part and a disc-shaped part which encloses the front end of said ring-shaped part, said ring-shaped part being engageable around said camera lens barrel such that said disc-shaped part covers the front end of the camera lens barrel and the photographic objective lens therein,
   a first protective means connected to said covering means so as to at least partially surround said camera actuation member and prevent operation thereof when said first covering portion is engaged around said camera lens barrel, and
   a second protective means connected to said covering means so as to prevent operation of said flash device switching member when said first covering portion is engaged around said camera lens barrel.

14. The lens cap as defined in claim 13 which is adapted for use with a camera which additionally includes a viewfinder window, wherein said covering means of said lens cap includes a second covering portion which covers the viewfinder window of said camera when said first covering portion is engaged around said camera lens barrel and wherein said first and second protective means are connected to said second covering portion.

15. The lens cap as defined in claim 14 wherein the second covering portion includes a generally rectangular front part which is integrally connected to the ring-shaped part of the first covering portion and extends in a generally perpendicular direction with respect to an imaginary cover line passing through the ring-shaped part.

16. The lens cap as defined in claim 15 wherein the second covering portion includes a top part which extends perpendicularly rearwardly from the edge of the front part remote from the first covering portion.

17. The lens cap as defined in claim 16 wherein the protective means comprises a three-sided protector wall which extends generally perpendicularly away from the top part.

18. The lens cap as defined in claim 17 wherein the second protective means comprises a generally rectangular projection which extends downwardly from the front part of the second covering portion.

19. The lens cap as defined in claim 17 wherein the first protective means includes a top wall which is connected to the three-sided protector wall to cover the top of the camera actuation member.

20. The lens cap as defined in claim 14 wherein the first and second covering portions and the first and second protective means are integrally molded of a plastic material.

21. The lens cap as defined in claim 14 wherein the camera with which the lens cap is used additionally includes a rangefinder window, and wherein the second covering portion of the covering means of the lens cap is shaped to cover the rangefinder window of the camera.

22. The lens cap as defined in claim 14 wherein the first covering portion of the covering means includes an engaging portion integrally connected to the ring-shaped part to enable the lens cap to be attached to a camera case used to contain the camera with which the lens cap is usable.

* * * * *